April 7, 1970          D. R. MALEY          3,504,524
METHOD OF THERMAL MATERIAL INSPECTION
Filed Sept. 9, 1966
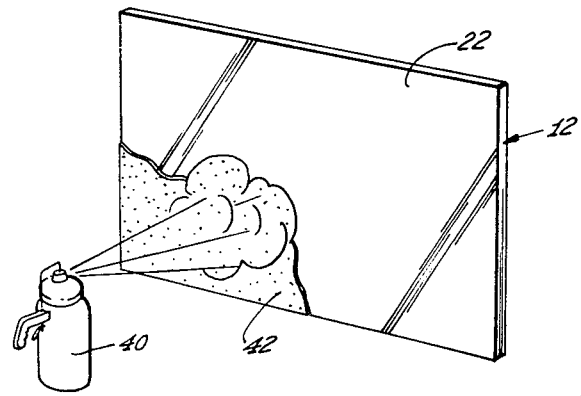
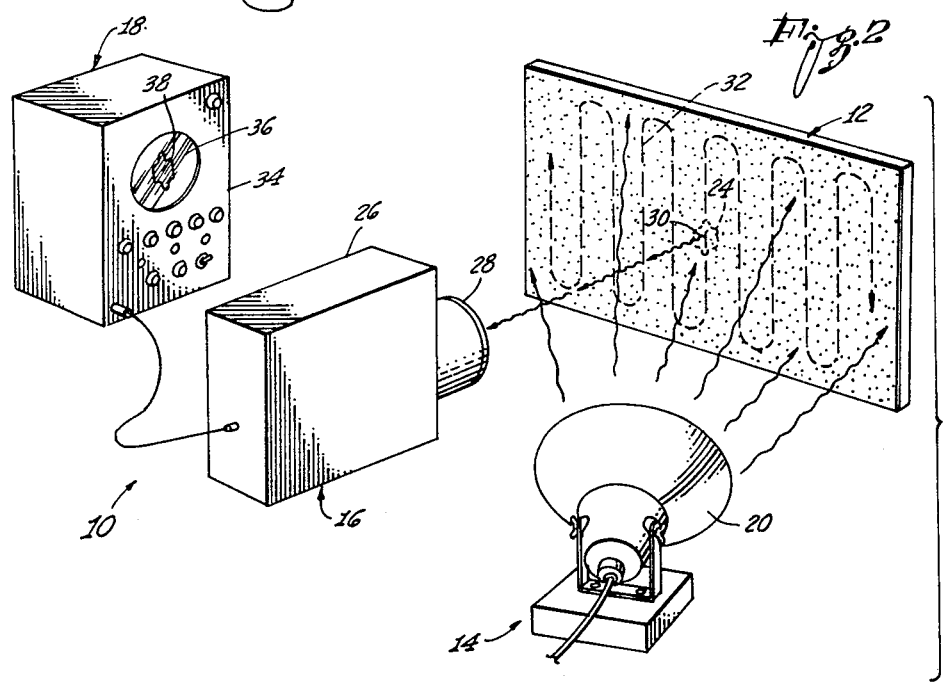
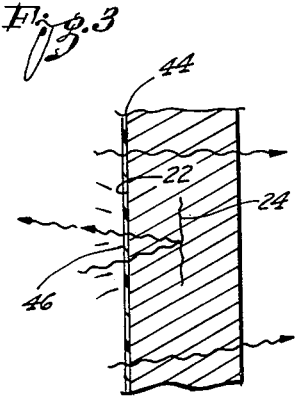
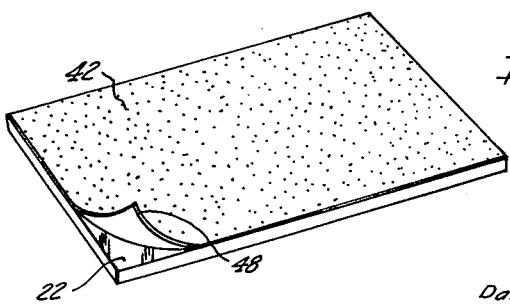
INVENTOR:
Dale R. Maley
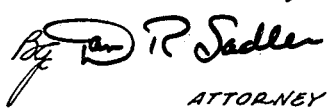
ATTORNEY

United States Patent Office 3,504,524
Patented Apr. 7, 1970

3,504,524
METHOD OF THERMAL MATERIAL INSPECTION
Dale R. Maley, Boulder, Colo., assignor to Automation Industries, Inc., El Segundo, Calif., a corporation of California
Filed Sept. 9, 1966, Ser. No. 578,227
Int. Cl. G01n 25/00
U.S. Cl. 73—15                          7 Claims

ABSTRACT OF THE DISCLOSURE

An infrared nondestructive testing means and method wherein a workpiece is sprayed with a vinyl base vehicle carrying a carbon pigment to form a constant, high emissivity surface in the infrared region which is easily strippable from the workpiece. The surface is heated by a suitable source of radiant energy. The temperature of successive spots is determined by scanning the coated surface with a radiometer. The deflection means of an oscilloscope or other display device are synchronized with the scanning radiometer, displaying flaws on an infrared picture of the workpiece.

---

The present invention relates to nondestructive testers and more particularly to infrared nondestructive testers for inspecting workpieces for internal defects, etc.

In a so-called infrared nondestructive testing system the temperatures of one or more incremental areas on the surface of the workpiece are determined while thermal energy is being transferred through the workpiece. If there are any local discontinuities in the workpiece, such as a void, inclusion, delamination, lack of bonding, etc., there is a corresponding local variation in the thermal conductivity whereby the rate of transfer is correspondingly altered. This, in turn, causes the surface temperatures of one or more of the incremental areas adjacent to the discontinuity to differ from the surrounding areas. Thus by determining the temperatures of these areas it is possible to locate hidden defects etc.

A very quick and accurate way of measuring the surface temperatures of small or incremental areas is to measure the radiations from the surface by a radiometer focused on just that area. By properly manipulating the radiometer and/or workpiece the entire surface of the workpiece may be rapidly scanned and an electrical signal developed which is a function of the surface temperature. If any local temperature variations are present there will be a corresponding variation in the signal.

Unfortunately, surface radiations are also a function of the emissivity of the radiating surface. If the surface has an emissivity approaching unity, the radiations will be more intense and a strong reliable signal is produced by the radiometer. However, when the emissivity approaches zero the radiations are relatively small and the signal is weak. If there are variations in the emissivity, even though the surface temperature remains substantially constant the signal will vary. As a result it has been found difficult to utilize an infrared tester on workpieces having an emissivity that is low or that varies.

It has also been found that when thermal energy is radiated onto the test surface irregular heating of the workpiece occurs if the reflectivity varies. This, in turn, affects the surface temperatures and produces irregularities in the temperature signal whereby the reliability of the test is degraded.

One means of overcoming these difficulties has been to paint the surface of the workpiece with a material that is dark in the infrared region, i.e., has a high emissivity. This provides a high emissivity that is substantially uniform over the entire test surface whereby a very reliable test can be performed. However, the coatings employed heretofore have been difficult to remove without special equipment, solvents, time consuming operations, etc. Also, some test surfaces are of a special nature and have a tendency to be destroyed or contaminated by the prior coatings or by the solvents etc. necessary to remove the coatings. As a consequence the use of special coatings for making nondestructive tests has generally been so objectionable as to preclude the use of infrared testing.

In order to overcome these difficulties it has been proposed to determine the emissivity of each of the radiating incremental areas and make appropriate compensations. One means of accomplishing this is disclosed and claimed in copending application Ser. No. 474,811, entitled, Material Tester, filed, July 26, 1965, in the name of Dale R. Maley and assigned of record to Automation Industries, Inc.

It has also been proposed to employ a two-color radiometer as disclosed and claimed in copending application Ser. No. 474,661 entitled, Nondestructive Tester, filed, July 26, 1965, in the name of Dale R. Maley and assigned of record to Automation Industries, Inc. In this system the surface radiations are determined in two different frequency bands and the ratio then used to determine the surface temperature.

Both of these systems are capable of making accurate and reliable tests. However, they tend to become somewhat complex and expensive. Moreover, although they are effective to compensate for variations in the emissivity they are not well suited for testing a workpiece having a low emissivity, shiny surface. For example, they are difficult to use for determining the degree of bonding of a chrome plating.

The present invention provides means for overcoming the foregoing difficulties. More particularly the present invention provides an infrared tester and method of testing wherein the emissivity of the test surface is increased to substantial unity and also the emissivity is standardized at some such level whereby a uniformly high quality temperature signal can be produced on all types of workpieces. In the single embodiment of the present invention disclosed herein this is accomplished by providing a material which may be applied to the workpiece so as to form a protective coating having uniform radiating characteristics. In addition the coating may be readily removed without any special equipment, solvents, etc., or in anyway imparing the surface of the workpiece.

In the embodiment disclosed herein a coating material is provided which may be applied to the test surface by spraying, dipping, painting, etc., to form a uniform coating that dried quickly whereby there is little waiting to make a test. The emissivity of the coating in the infrared region can be made very high and also very uniform. Moreover, the coating strongly adheres to the surface and will last for extended periods of time, even though it is extensively handled. However whenever desired, the coating may be very quickly "peeled" from the workpiece without any special equipment, solvents, etc., whereby the test surface is left free of residue or other impairment for future uses.

These and other features and advantages of the present invention will become readily apparent from the following detailed description of one embodiment thereof particularly when taken in connection with the accompanying drawings wherein like reference numerals refer to like parts and wherein:

FIGURE 1 is a perspective view of a coating material being applied to a workpiece preparatory to making an infrared inspection thereof;

FIGURE 2 is a perspective view of the coated workpiece being inspected by the infrared test system;

FIGURE 3 is a fragmentary cross sectional view of a coated workpiece suitable for testing, and FIGURE 4 is a perspective view of the coating being removed from the workpiece following the completion of the inspection.

Referring to the drawings in more detail and particularly to FIGURE 2, the present invention is particularly adapted to be used with an infrared tester 10 for nondestructively inspecting a workpiece 12 for hidden defects and/or for measuring the various dimensions thereof, etc. The tester 10 includes means 14 for transferring thermal energy through the workpiece 12, means 16 for measuring the individual temperatures of successive incremental areas of the workpiece 12 and an output device 18 for indicating the characteristics of the workpiece 12.

The thermal energy transfer means 14 may be of any desired variety. For example, it may absorb energy from the workpiece 12 and cause the transfer to result from cooling or it may supply the energy to the workpiece 12 and cause a transfer by heating. Also the thermal energy transfer may occur in a very small region corresponding to the incremental area or it may occur over a large region such as over the entire workpiece.

The present thermal energy transfer means includes a radiator for projecting radiant energy onto a large area. For purposes of illustration it is shown as heating substantially the entire workpiece. However if the test structure is very large it may be desirable to successively heat segments of the structure. Preferably the radiations are of substantially uniform intensity over the entire heated surface whereby the amount of heating of each incremental area is substantially uniform. Although the radiant energy may be of any variety, such as microwave, etc., it has been found advantageous to utilize a heating coil or incandescent lamp with a heated filament disposed within a dished reflector 20. Such an arrangement produces radiations which are predominantly in the red end of the visible spectrum and/or in the so-called near infrared region.

The intensity of the energy incident upon the work surface, of course, depends upon the type of material, the reflectivity of the surface, the rate at which the test is to be made etc. However the energy is normally in sufficient quantity to raise the surface temperature by a relatively small amount, for example on the order of 50 or 75 F. degrees above ambient. With a temperature rise of this magnitude the radiations from the test surface will have a wavelength in the so-called far infrared region, or in a range of about 2 to 15 microns. It can be appreciated if the radiant energy incident upon the surface 22 of the workpiece 12 is outside of this range the energy reradiated from the surface 22 will be distinguishable from any incident energy reflected from the surface 22. Thus the radiations in this band will be a function of the temperature of the surface 22.

A substantial portion of the radiant energy incident on the surface 22 is coupled into the workpiece 12 and transformed into thermal energy. As illustrated in FIGURE 3, a large part of this thermal energy flows through the workpiece 12 to the reverse side. The rate at which this energy is transferred through the workpiece 12 is dependent upon the thermal conductivity of the workpiece 12 and the temperature gradient.

If there is a discontinuity 24 in the workpiece 12 such as a crack or void, a delamination between bonded layers, etc., a localized thermal discontinuity is formed. The rate at which energy is transferred is thereby altered in the area in and around the discontinuity 24. As a consequence the temperatures of small incremental areas adjacent to the discontinuity 24 will differ somewhat from the temperatures of the surrounding incremental areas. Since the intensity and wavelength of the energy reradiated from each incremental area is dependent upon its surface temperature its radiations will vary from those of the surrounding portions.

The means for measuring the surface temperature may be of any desired variety. However, it has been found a radiometer 26 responsive to wavelengths of the reradiated energy is particularly well suited for this purpose. The radiometer 26 may include suitable optics such as a lens system 28 for focusing onto a relatively small incremental area or scan spot 30.

The radiometer 26 is thus responsive to only the energy reradiated from this small area 30 and is effective to produce an electrical signal which is a function of the temperature of this area 30. It is to be noted the signal from the radiometer 26 will also be a function of the emissivity of the area 30.

The radiometer 26 preferably also including suitable scanning means for moving the incremental area or scan spot 30. By way of example this spot 30 may be made to follow a series of substantially parallel lines 32 as represented by the dashed line in FIGURE 2. As a consequence the entire surface 22 will be scanned and the electrical signal from the radiometer 26 will represent a combined function of the temperature and the emissivity along this line 32.

The output means 18 may be of any desired variety capable of responding to the electrical signals from the radiometer 26. In the present instance this means 18 includes a cathode ray oscilloscope 34 which is coupled to the radiometer 26. The horizontal and vertical deflection means in the oscilloscope 34 are coupled to the scan means for the radiometer 26. As a consequence the raster on the face of the cathode ray tube 36 will be scanned in synchronism with scanning of the workpiece 12 by the radiometer 26.

The electron beam in the cathode ray tube 36 may be modulated as a function of the signal from the radiometer 26 whereby the raster will correspond to the surface temperature of the workpiece 12. In one embodiment the intensity of the beam was modulated as a function of the amplitude of the temperature whereby the raster would include a bright spot 38 (or dark spot if desired) corresponding to any hot areas (or cold areas if they are of interest). Such a spot 38 would thereby indicate that a discontinuity exists at this point in the workpiece 12. It can thus be determined from a quick look at the oscilloscope whether the workpiece is defective or has the desired characteristics.

The foregoing type of tester 10 is effective to scan the workpiece 12 and produce signals indicative of the characteristic of the workpiece 12. However, it has been found that the emissivity of the workpiece 12 may vary over substantial areas and/or may be relatively low so that weak temperature signals are produced. In order to overcome these disadvantages the present invention provides a coating 42 on the surface 22 of the workpiece 12 which has a substantially uniform emissivity and has an emissivity which is in the region of unity. This coating 42 is intimately bonded onto the surface of the workpiece 12 whereby the thermal energy in the workpiece 12 is efficiently and uniformly coupled from the surface and through the coating 42 so as to be radiated therefrom.

Although a wide variety of coatings may be employed, it has been found desirable to use a material that can be easily applied to the surface 22 and can be easily removed. The coating material may be applied with a brush or roller etc. or even by dipping. However it has been found preferable to apply the material by spraying similar to that shown in FIGURE 1. It is also normally desirable for the coating material to be contained in a vehicle that is highly volatile. This will cause the coating 42 to dry very rapidly whereby the workpiece 12 can be handled almost immediately following the application of the coating 42.

As soon as the material has dried the resultant coating 42 should not only be very tough and durable but should also adhere very tightly to the work surface 22 so as to form little or no thermal barrier between the coating and the workpiece. The coating 42 will thus form a protective layer on the surface 22. This will reduce the possibility of damage to the test surface 22 such as scratching or marring and also permit extensive handling of the workpiece 12 without materially altering the surface characteristics such as by finger prints. Moreover any thermal energy in the workpiece 12 and/or the coating 42 may flow across the interface 44 therebetween. There will be little or no discontinuity at the interface 44 and more importantly the thermal transfer characteristics will be uniform throughout all portions of the interface 44.

It is also highly desirable for the material to be capable of being easily removed from the test surface 22 without any special tools or solvents, etc. By way of example the coating 42 may be removed from the surface 22 by stripping. As best seen in FIGURE 4 one corner 48 of the coating may be manually worked loose. Following this the corner 48 may be manually pulled, thereby stripping the coating 42 back across the test surface 22.

Once the coat 42 has dried it should have a very uniform emissivity and reflectivity. Preferably, the emissivity is as close to unity as possible. It has been found this may be accomplished by adding a material such as lamp black to the coating material. Once the material has dried the resultant coating 42, preferably, has a high cohesion that is greater than its adhesion to the workpiece. This will allow the coating to be pealed off.

The coating 42 may be formed from a wide variety of material. However it has been found plastic coatings and particularly those having a vinyl base are particularly suitable for this purpose. Such plastics produce a thin pliable film that adheres to the surface 22. Because of the high cohesion of the film it can be easily stripped from the workpiece in a single large sheet. One such material is sold under the name of James B. Sipes Industrial Finish #XB-8104 Green Peel Coating.

In order to improve the emissivity of this coating a suitable pigment may be added to the material prior to the time it is applied to the test surface. This pigment should be substantially black in the far infrared region of 2 to 15 microns. By way of example it has been found that carbon or lamp black and similar materials are eminently satisfactory for this purpose.

In order to perform a test the coating material is first applied to the test surface 22. Normally this is applied by spraying with a spray gun 40 as shown in FIGURE 1. As soon as the material is applied it will very quickly dry into a tough coating 42 which adheres tightly to the test surface 22. The workpiece 12 may then be placed in the test position and irradiated with energy from the radiator 20. Since the surface 22 now has a very high emissivity it will also have a very low reflectivity. Accordingly, a very large portion of the radiations are absorbed by the coating 42.

The radiations absorbed by the coating 42 become thermal energy within the workpiece. A portion of the thermal energy flows through the interface 44 into the workpiece 12. The amount of this flow is a function of the thermal conductivity of the material in the workpiece 12 and whether there are any discontinuities 24 present. If the discontinuity 24 is a void or crack, etc., it will normally reduce the flow of energy away from the test surface 22 whereby the surface 22 immediately adjacent the discontinuity will be somewhat hotter than in the surrounding areas.

The amount of energy reradiated from the surface 22 is, of course, a function of the temperature and emissivity of the surface 22. Since the coating 42 provides a high emissivity and a uniform emissivity the radiations will be substantially uniform if the surface temperature is uniform. Any variations in the radiations will be essentially a function of just the surface temperature.

As soon as the test surface 22 has been heated to a sufficient degree to insure a satisfactory temperature change, the radiometer 26 may be turned on and allowed to scan the worksurface 22. The radiometer 26 will then produce a temperature signal which corresponds to the temperatures of the incremental areas of the surface 22. The signal will be substantially uniform except in those areas where the hot spot 46 exists. When the hot spot 46 is scanned a corresponding rise in the temperature signal occurs.

The temperature signal from the radiometer 26 is coupled into the oscilloscope 18 and is effective to modulate the amplitude of the electron beam. As a consequence the display will be substantially uniform if the surface temperature is uniform. However, if there is a hot spot 46 the display will include a bright spot 48.

It may thus be seen the operator may quickly observe the oscilloscope 18 and determine whether or not there is a hidden defect 24 in the workpiece 12. Once the test is completed the workpiece 12 may be marked to indicate the results of the test. If desired these results may be marked directly on the coating 42 as this will not effect the test surface 22 or in any way mar the workpiece 12.

The coating 42 may be left on the workpiece indefinitely so as to protect the test surface 22 and/or to indicate the piece 12 has been tested and the results of the test. Any time it is desired to reexpose the test surface 22 the coating 42 may be quickly removed by peeling a corner of the coating from the workpiece. The free corner may then be manually raised so as to strip the coating from the test surface 22 substantially as shown in FIGURE 4. The removal of this coating 42 is carried out without the necessity of using any special tools or solvents. Moreover it is quickly and completely removed without having any residue on the test surface 22 or otherwise damaging it.

What is claimed is:

1. The method of inspecting a workpiece including the steps of
    applying a constant emissivity test layer of material to a surface of the workpiece, said test layer including a material having a large amount of cohesion and less adhesion to said surface,
    varying the temperature of the workpiece a predetermined amount from the surrounding ambient temperature,
    sensing the thermal energy radiated from a scan spot on the constant emissive test layer,
    said scan spot is moved over the test layer on the surface of the workpiece in a scan pattern, and
    stripping the cohesive test layer from the surface.

2. The method of claim 1 including the additional steps of
    transferring thermal energy into said workpiece after said layer is applied whereby the temperature of the workpiece is raised above the ambient temperature, and
    allowing the thermal energy to be radiated out of the workpiece for a predetermined interval before the thermal radiations are sensed.

3. The method of claim 1 including the additional steps of
    adding a pigment to said material before it is applied to the workpiece whereby said test layer has a high and substantially uniform thermal emissivity,
    transferring thermal energy into said workpiece after said layer has been applied whereby the temperature of the workpiece is raised above the ambient temperature, and
    allowing the thermal energy to be radiated out of the workpiece for a predetermined interval before the thermal radiations are sensed.

4. The method of inspecting a workpiece including the steps of
    coating a surface of the workpiece with a material having a high and substantially uniform thermal emissivity,
    allowing said material to form into a test layer having a high cohesion but less adhesion to the surface,
    transferring thermal energy through the workpiece whereby the temperature of the surface of said workpiece differs from the surrounding ambient temperature, sensing at a scan spot the thermal energy transferred from the workpiece through the layer and radiated therefrom, moving the scan spot over the test layer in a scan pattern, producing a signal in response to said thermal radiations, and stripping the test layer from said surface.

5. The method of claim 4 including the additional step of adding a pigment to said material whereby the resultant test layer has a high and substantially uniform thermal emissivity in the range of the radiations therefrom.

6. The method of claim 5 wherein said material is a fluid at the time it is applied to the surface and it dries into a solid test layer.

7. The method of claim 6 wherein the thermal energy is transferred into the workpiece whereby the surface temperature of the workpiece is raised above the surrounding ambient temperature.

References Cited

UNITED STATES PATENTS

| | | | |
|---|---|---|---|
| 3,020,745 | 2/1962 | Sielicki | 73—15 |
| 3,100,755 | 8/1963 | Ehrlich. | |

OTHER REFERENCES

An article by R. J. Fabian, entitled, "Strippable Coatings," from "Materials in Design Engineering," May 1959, pp. 110–115; pp. 112–114 relied upon.

JAMES J. GILL, Primary Examiner